United States Patent

Page

[11] Patent Number: 5,752,465
[45] Date of Patent: May 19, 1998

[54] SELF-CLEANING PET LITTER BOX

[76] Inventor: Bret D. Page, 6408-K The Lakes Dr., Raleigh, N.C. 27609

[21] Appl. No.: 901,635
[22] Filed: Jul. 28, 1997
[51] Int. Cl.$^6$ .................................................. A01K 1/035
[52] U.S. Cl. .................................................. 119/166
[58] Field of Search ............................... 119/166, 165, 119/168; 209/288, 235, 373

[56] References Cited

U.S. PATENT DOCUMENTS

| | | | |
|---|---|---|---|
| 4,120,264 | 10/1978 | Carter | 119/166 |
| 5,048,464 | 9/1991 | Shirley | 119/166 |
| 5,107,797 | 4/1992 | LaRoche | 119/166 |
| 5,178,099 | 1/1993 | Lapps et al. | 119/166 |
| 5,394,833 | 3/1995 | Glass | 119/166 |
| 5,402,751 | 4/1995 | De La Chevrotiere | 119/166 |
| 5,507,252 | 4/1996 | Ebert | 119/166 |
| 5,509,379 | 4/1996 | Hoeschen | 119/116 |
| 5,544,620 | 8/1996 | Sarkissian | 119/166 |
| 5,551,375 | 9/1996 | Flores | 119/166 |
| 5,622,140 | 4/1997 | McIlnay-Moe | 119/166 |

Primary Examiner—Michael J. Carone
Assistant Examiner—Yvonne R. Abbott
Attorney, Agent, or Firm—Norman B. Rainer

[57] ABSTRACT

A pet litter holding device which facilitates removal of animal waste and re-use of the litter includes a stationary base and a drum rotatively supported by the base. The drum is bounded by an enclosing wall which terminates in lateral extremities equipped with flanges that slidably embrace the base. A sieving panel isolates solid and clumped litter during rotation of the drum. A funnel region of the enclosing wall directs the isolated waste material downwardly to an exit spout adapted to hold a disposable plastic bag that receives the waste material.

8 Claims, 3 Drawing Sheets

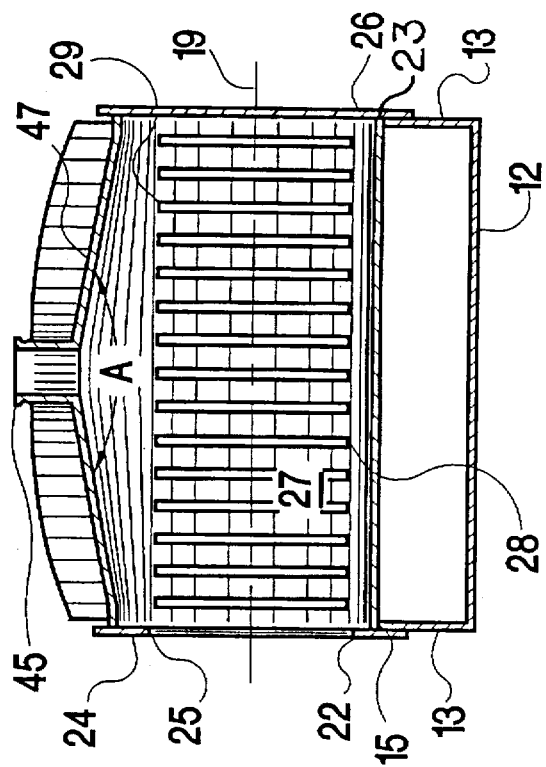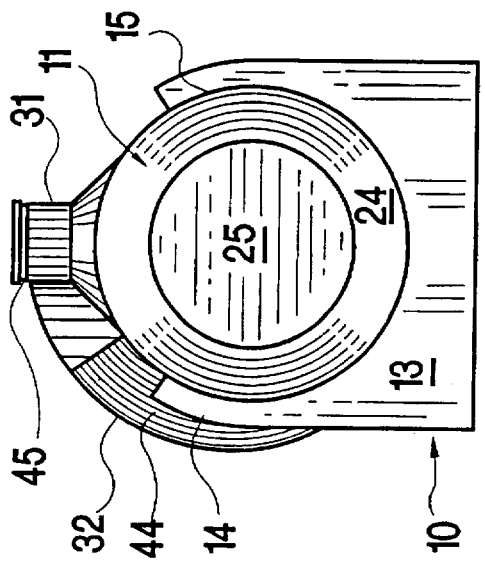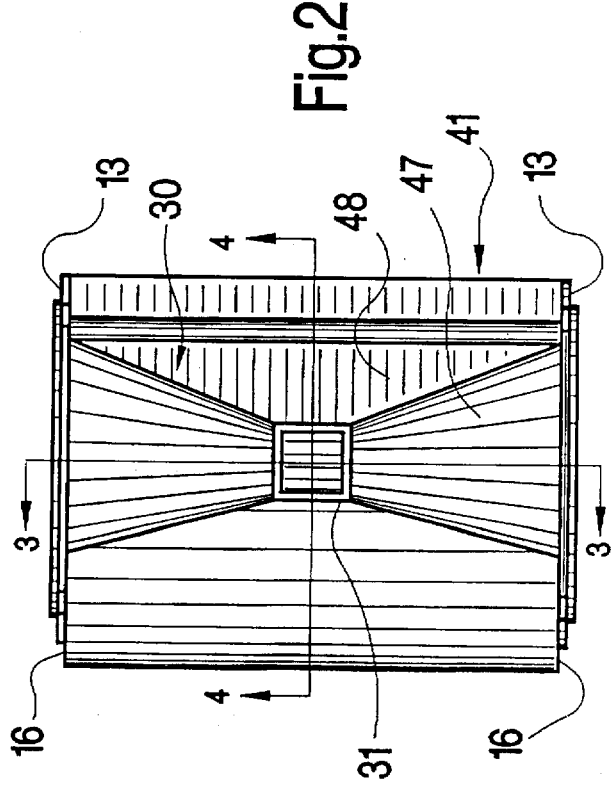

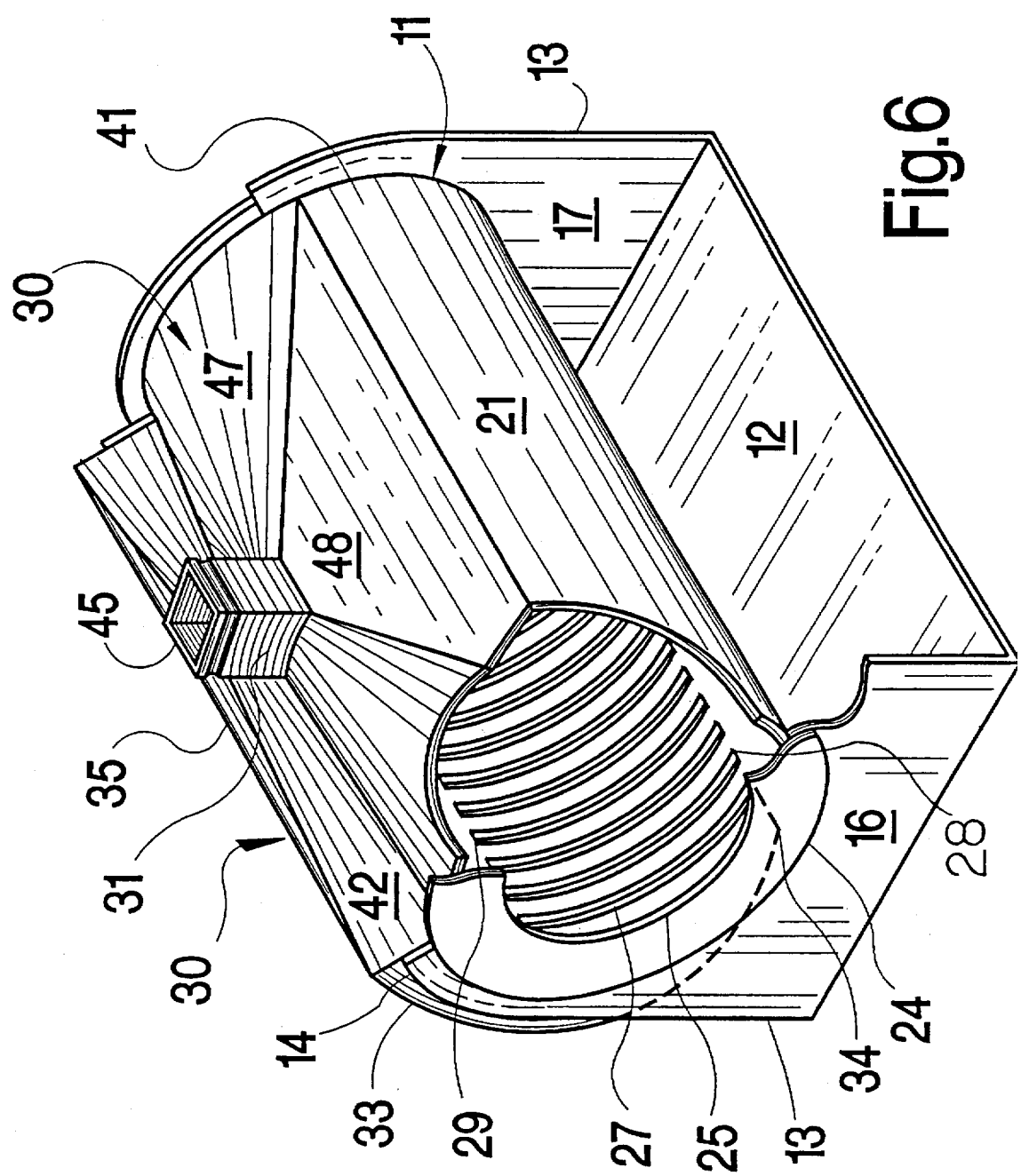

SELF-CLEANING PET LITTER BOX

BACKGROUND OF THE INVENTION

1. Field of the Invention

The present invention concerns a pet litter box having improved means for sieving the litter and disposing of the pet waste.

2. Description of the Prior Art

A known problem with the ownership of house pets, particularly cats, is the unpleasant and sometimes noxious odors and fumes associated with pet waste. Conventional waste boxes are frequently used for collecting pet waste in a quantity of litter so as to reduce the pet waste odor in the environment surrounding the box. Such boxes include an open tray which retains a quantity of litter accessible to the pet. The litter is provided so that the pet may bury the waste within the litter. The litter also helps shield the odors and contain the fumes of the pet waste until the combined litter and waste are removed from the box and placed in a receptacle for disposal.

The litter changing process, however, requires a significant amount of human contact with the waste box, and waste residue, odor and fumes. Contact with pet waste is undesirable as it may cause toxoplasmosis, which is known to cause miscarriages, and may be spread from a pregnant woman to her child, possibly resulting in neurological and ocular problems in the child. Also, the pet waste, litter dust, and waste fumes can be noxious to people leading to nausea and lung infections.

Two methods are typically employed for maintaining conventional waste boxes. In the first method, the pet is allowed to deposit waste in the litter box over the course of several days until the litter is saturated. Once the litter is saturated with waste, the combined litter and waste is discarded, resulting in the use of unnecessary quantities of litter. In the second method, the operator, using a hand scoop, removes contaminated portions of the litter. In each method the operator is placed in close proximity to the waste, odor, fumes, and dust. Additionally, when waste boxes are used by pets, litter is often kicked out by the pet and is also scattered out of the box as the pet steps out of the box, further wasting litter, and requiring more cleaning.

Recently, clumping litter, which has finer granules than conventional litter, has been developed. Clumping litter, generally consisting of granular inorganic clays, forms hardened lumps out of solid and liquid pet waste. These lumps may be separated from the clean litter by sieving.

Although clumping litter is more expensive than conventional litter, the ability to remove liquid waste from the litter lengthens the amount of time that the litter may remain in the litter box, and results in an overall reduction in litter costs. In the interest of securing greater utilization of the more expensive clumping litter, some sort of cleaning and re-use of the litter is generally indicated. However, use of a hand scoop does not provide sufficiently thorough cleaning.

Several pet waste boxes have been developed which attempt to address the problems listed above. Such devices generally provide a chamber for collecting pet waste in a quantity of pet litter, and are able to separate the waste from the litter by sieving.

U.S. Pat. No. 5,402,751 to Chevrotiene concerns a litter box equipped with a removable lid having a sieving screen. Rotation of the box separates out the solid and clumped debris, and deposits it into the lid which then must be removed by hand, dumped and stored separately, whether soiled or cleaned, until its next use.

U.S. Pat. No. 5,394,833 to Glass discloses an animal waste disposal apparatus adapted to be positioned directly above a litter box. The disposal apparatus, of considerable size, filters the litter, which falls downwardly into a waiting empty litter box. Removed solids and clumps are channeled to a collection bag. Though potentially effective, the falling litter would be expected to produce a dust problem.

U.S. Pat. No. 5,507,252 to Ebert concerns a rotative litter box having a built-in sieving screen. Rotation of the box separates the waste debris and deposits it in a tray which is manually removed for disposal of its contents.

U.S. Pat. No. 5,509,379 to Hoeschen discloses a litter box having a rotating cylinder equipped with a perforated sieving surface. The perforated surface, during rotation, removes solid and clumped waste and conveys it to a collection chamber which must be manually removed for emptying.

U.S. Pat. No. 5,551,375 to Flores relates to a litter box having a rotatable cylindrical drum equipped with a sieve screen and a removable collection drawer. Rotation of the drum achieves deposition of the solid and clumped waste into the collection drawer.

It is notable that the prior art devices discussed above do not efficiently utilize space. For example, the various means for separating and removing waste from litter employed in the prior art devices have required the use of relatively large and clumsy chambers in order to provide sufficient interior room for use by a pet.

Therefore, a significant and heretofore unsolved need exists to provide a pet waste box having an improved means for separation of pet waste from litter, and minimizing human exposure to the waste and its odors or surfaces contaminated with the waste. There exists an additional need to provide a pet waste box which minimizes dust generation during a sieving operation, and which reduces the amount of litter which might scatter out of the device. Furthermore, there exists the need to provide a pet waste box which more efficiently utilizes space.

It is accordingly an object of the present invention to provide a litter holding device which facilitates separation of solid and clumped animal waste from litter material confined within said device.

It is another object of this invention to provide a device as in the foregoing object which minimizes human contact with the animal waste or surfaces contaminated therewith.

It is a further object of the present invention to provide a device of the aforesaid nature which is of relatively small size and easy to manipulate for the purpose of removing animal waste therefrom.

It is yet another object of this invention to provide a litter box of the aforesaid nature which minimizes dust and odor production during the separation of animal waste from the litter.

It is a still further object of the present invention to provide a litter box of the aforesaid nature which is not intimidating to pets and is of durable and simple construction amenable to low cost manufacture.

These objects and other objects and advantages of the invention will be apparent from the following description.

SUMMARY OF THE INVENTION

The above and other beneficial objects and advantages are accomplished in accordance with the present invention by a litter holding device comprising:

a) a stationary base comprised of a bottom panel and two spaced apart facing side panels upwardly emergent from said bottom panel and provided with identical arcuately-shaped recesses centered upon a lateral axis parallel to said base, said side panels each bounded in part by exterior surfaces and facing interior surfaces, and b) a drum rotatively supported by said base and comprised of an enclosing wall having inside and outside surfaces, a portion of said wall having a circular cylindrical configuration centered upon said lateral axis, said drum terminating in front and rear planar lateral extremities, said front extremity having an attached front flange panel having a large circular animal access portal centered therein, said rear extremity having a rear flange panel disposed in parallel relationship to said front flange panel, said front and rear flange panels serving to embrace said side panels in sliding contact with the exterior surfaces thereof c) a sieving panel disposed within said drum and extending laterally between said flanges, said sieving panel having leading and trailing extremities and d) a funnel region outwardly directed from the enclosing wall adjacent the trailing extremity of said sieving panel, and terminating in an exit spout.

In a preferred embodiment, a storing chamber is disposed upon the outside surface of said enclosing wall in overlying relationship with said sieving panel, said storing chamber bounded in part by an external panel having a leading extremity which is tangentially emergent from said outside surface, and a trailing extremity spaced circumferentially away from said sieving panel and radially spaced from said enclosing wall.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a front view of an embodiment of the litter box of this invention shown in a state ready for use by the animal.

FIG. 2 is a top view of the embodiment of FIG. 1.

FIG. 3 is a sectional view taken in the direction of the arrows upon the line 3—3 of FIG. 2.

FIG. 6 is a perspective view of an embodiment of the litter box of this invention with portions broken away.

DESCRIPTION OF THE PREFERRED EMBODIMENT

Figure 4:
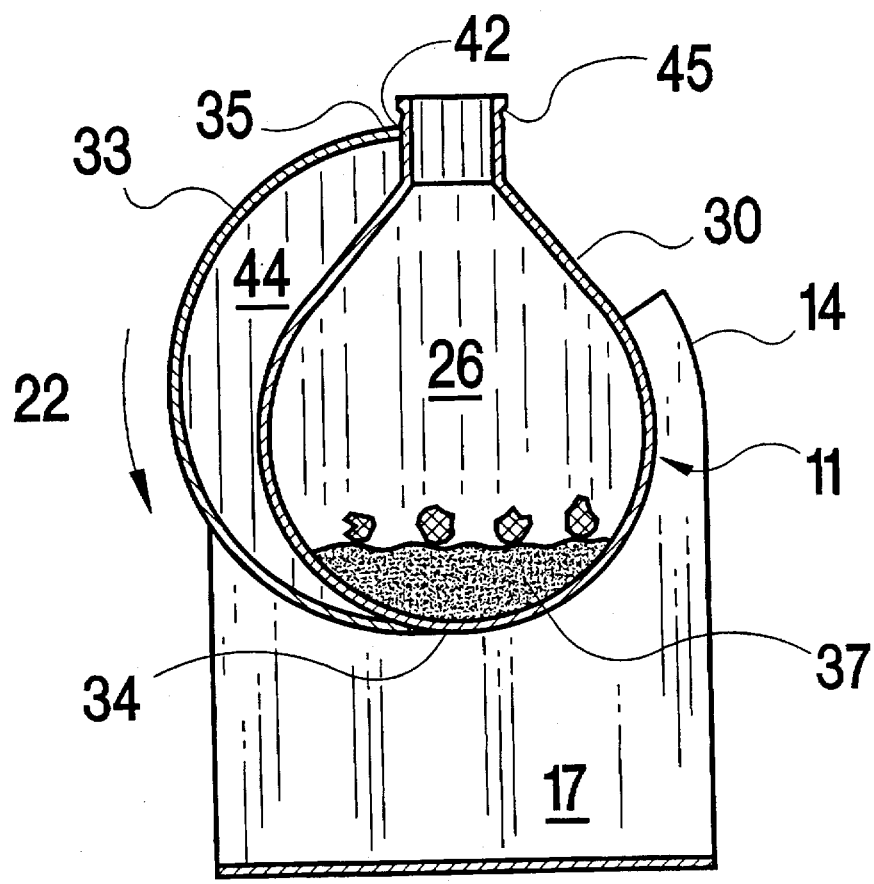
FIG. 4 is a sectional view taken in the direction of the arrows upon the line 4—4 of FIG. 2.
Figure 5:
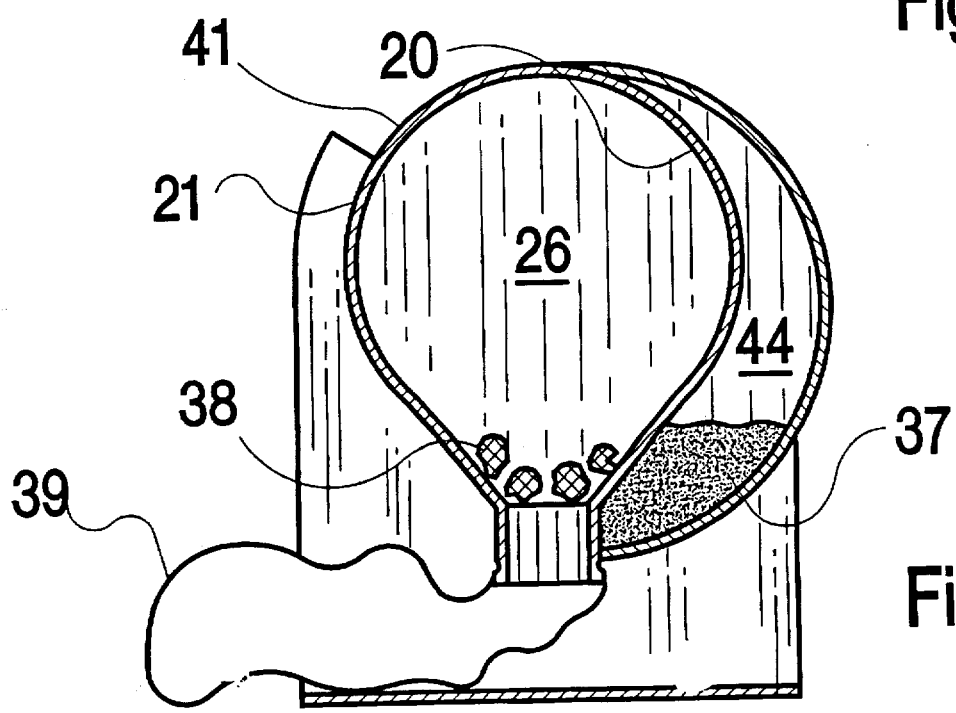
FIG. 5 is a sectional view corresponding to FIG. 4 with the drum having been rotated 180 degrees in the counter clockwise direction, and shown with a waste-collecting bag.

Referring to FIGS. 1–6, an embodiment of the litter-holding device or "litter box" of the present invention is shown comprised of a stationary base 10 and drum 11 rotatively supported by said base.

Base 10 is of metal or rigid plastic construction, and comprised of horizontal bottom panel 12 of substantially rectangular perimeter, and paired spaced apart parallel flat side panels 13 upwardly emergent from said bottom panel and terminating in upper extremities 14. In preferred embodiments, the side panels are continuous integral extensions of the base panel, as components of a monolithic base structure. The side panels are provided with identical arcuately shaped recesses 15 centered upon a lateral axis 19 parallel to said bottom panel and residing in a vertical plane that bisects said bottom panel. Said recesses 15 are preferably of circular shape except for an upper portion which opens onto the upper extremity of the side panels. Such manner of construction facilitates engagement of drum 11 with the base, as will be shown hereinafter. Side panels 13 are further characterized in being bounded in part by exterior surfaces 16 and facing interior surfaces 17.

Drum 11 is defined by an enclosing wall 41 having inside and outside surfaces 20 and 21, respectively. A portion of said wall has a circular cylindrical configuration centered upon axis 19. Enclosing wall 41 extends between front and rear planar lateral extremities 22 and 23, respectively. Front extremity 22 has attached thereto a vertically disposed front flange panel 24 having a large circular animal access portal 25 centered therein. Rear extremity 23 has attached thereto a vertically disposed rear flange 26. Said front and rear flanges serve to embrace said side panels in sliding contact with the exterior surfaces 16 thereof.

A sieving panel, in the form of a zone of perforations 27, is incorporated into enclosing wall 41. Said zone has leading and trailing extremities 28 and 29, respectively, spaced apart between 35 and 50 degrees of the contour of the cylindrical portion of the drum. The preferred, illustrated type of perforation is a grate-like array of elongated slots disposed as arc-like portions of the circumference of enclosing wall 41 in orthogonal relationship to axis 19. The zone of perforations extends between both lateral extremities of the drum.

A funnel region 30 is outwardly directed from the drum adjacent the trailing extremity of the zone of perforations, and terminates in an exit spout 31. Said funnel region is defined by surfaces 47 and 48 which converge upon exit spout 31 in directions respectively parallel to and orthogonal to axis 19.

The convergence angle A of surfaces 47, shown in FIG. 3, is between 120 and 160 degrees. Convergence angles smaller than 120 degrees, which produce a steeply defined funnel region, displace exit spout 31 too far from enclosing wall 41. Convergence angles larger than 160 degrees produce a shallow funnel region which does not efficiently convey solid waste from the drum to exit spout 31.

In the exemplified embodiment, a storing chamber 32 is disposed upon the outside surface 21 of enclosing wall 41 in overlying relationship with said zone of perforations. Said storing chamber is bounded in part by an external panel 33 having a leading extremity 34 which is tangentially emergent from outside surface 21 of said enclosing wall, and a trailing extremity 35 circumferentially advanced from the trailing extremity 29 of said zone of perforations. Storing chamber 32 is further bounded by end wall 42 and opposed lateral walls 44. The volume of storing chamber 32 is such as to be able to hold the entire batch of litter 37 that normally resides in drum 11. In alternative embodiments, the storing chamber may be replaced by a region which transiently accommodates sieved litter while drum 11 is rotated.

In the use and operation of the exemplified embodiment of the litter box of the present invention, when the drum is in the position shown in FIG. 1 wherein exit spout 31 is upwardly directed, litter is disposed upon the bottom of drum 11. In this position of use, the cat or other animal is able to enter drum 11 through access portal 25 and make use of the litter. When it is desired to remove solid and clumped animal waste 38 from the litter, drum 11 is manually rotated in the counter clockwise direction. Such motion causes unclumped litter to pass by sieving action through the slots in the zone of perforations, and become confined within storing chamber 32. The solid and clumped waste 38 is caused to move downwardly by gravity effect into funnel region 30 and thence to exit spout 31. A disposable plastic bag 39 is caused to removably engage spout 31. When the waste 38 has entered bag 39, the direction of rotation is reversed. With the clockwise motion that restores spout 31 to its initially uppermost position, clean litter that was stored in chamber 32 now passes back through the slots of said zone of perforations, and comes to rest in the bottom of the drum, thereby restoring the device to the starting or use state. The bag 39, containing the separated waste is easily detached from spout 31 and disposed of. A retaining lip 45 may be disposed atop spout 31 to facilitate securement of the bag with the aid of a rubber band. Drum 11 and base 10 are preferably fabricated of durable, washable plastic material such as thermoplastic polymers amenable to shaping by injection molding techniques.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A litter holding device comprising:

a) a stationary base comprised of a bottom panel and two spaced apart facing side panels upwardly emergent from said bottom panel and provided with arcuately-shaped recesses centered upon a lateral axis parallel to said base, said side panels each bounded in part by exterior surfaces and facing interior surfaces, and b) a drum rotatively supported by said base and comprised of an enclosing wall having inside and outside surfaces, a portion of said wall having a circular cylindrical configuration centered upon said lateral axis, said drum terminating in front and rear planar lateral extremities, said front extremity having an attached front flange panel having a large circular animal access portal centered therein, said rear extremity having a rear flange panel disposed in parallel relationship to said front flange panel, said front and rear flange panels serving to embrace said side panels in sliding contact with the exterior surfaces thereof c) a sieving panel disposed within said drum and extending laterally between said flanges, said sieving panel having leading and trailing extremities and d) a funnel region outwardly directed from the enclosing wall adjacent the trailing extremity of said sieving panel, and terminating in an exit spout.

2. The litter holding device of claim 1 wherein said sieving panel is incorporated into said enclosing wall as an integral portion thereof.

3. The litter holding device of claim 2 wherein said sieving panel is comprised of a zone of perforations disposed as a grate-like array of parallel elongated slots in said enclosing wall, the direction of elongation of said slots being in orthogonal relationship to said axis.

4. The litter holding device of claim 1 wherein said funnel region is defined by surfaces which converge upon said exit spout in directions parallel to and orthogonal to said axis.

5. The litter holding device of claim 4 wherein said surfaces which converge upon said exit spout in a direction parallel to said axis have a convergence angle between 120 and 160 degrees.

6. The litter holding device of claim 1 further comprising a storing chamber upon the outside surface of said enclosing wall in overlying relationship with said sieving panel.

7. The litter holding device of claim 6 wherein the volume of said storing chamber is sufficient to accommodate all the litter held by said device.

8. The litter holding device of claim 1 wherein a retaining lip is associated with said exit spout.

* * * * *